L. J. STEPHENSON.
MOTOR CONTROL SYSTEM.
APPLICATION FILED NOV. 28, 1919.

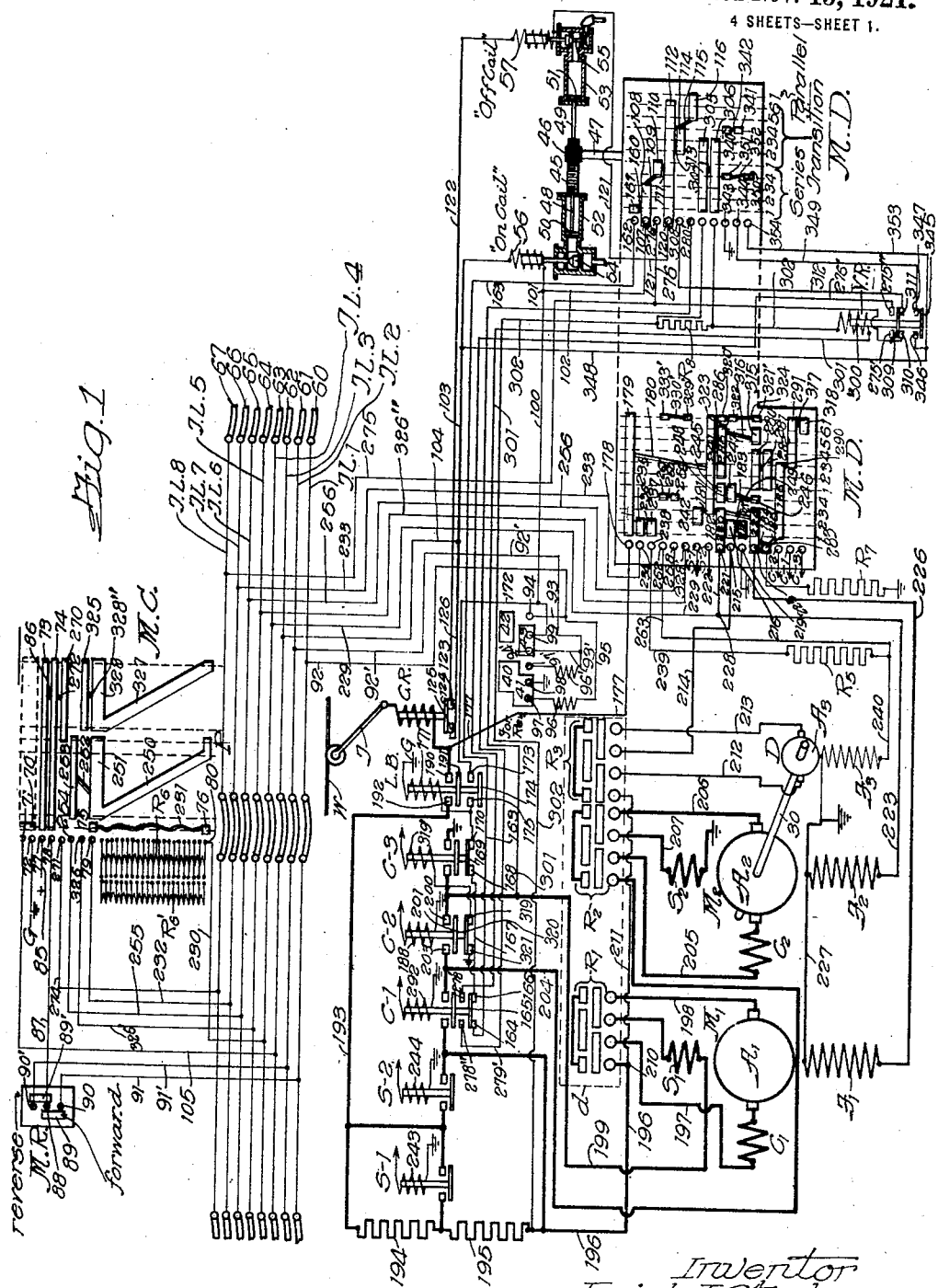

1,397,335.

Patented Nov. 15, 1921.

Inventor
Leigh J. Stephenson
Williams, Bradbury & Co.
Attys.

L. J. STEPHENSON.
MOTOR CONTROL SYSTEM.
APPLICATION FILED NOV. 28, 1919.
1,397,335.
Patented Nov. 15, 1921.
4 SHEETS—SHEET 3.
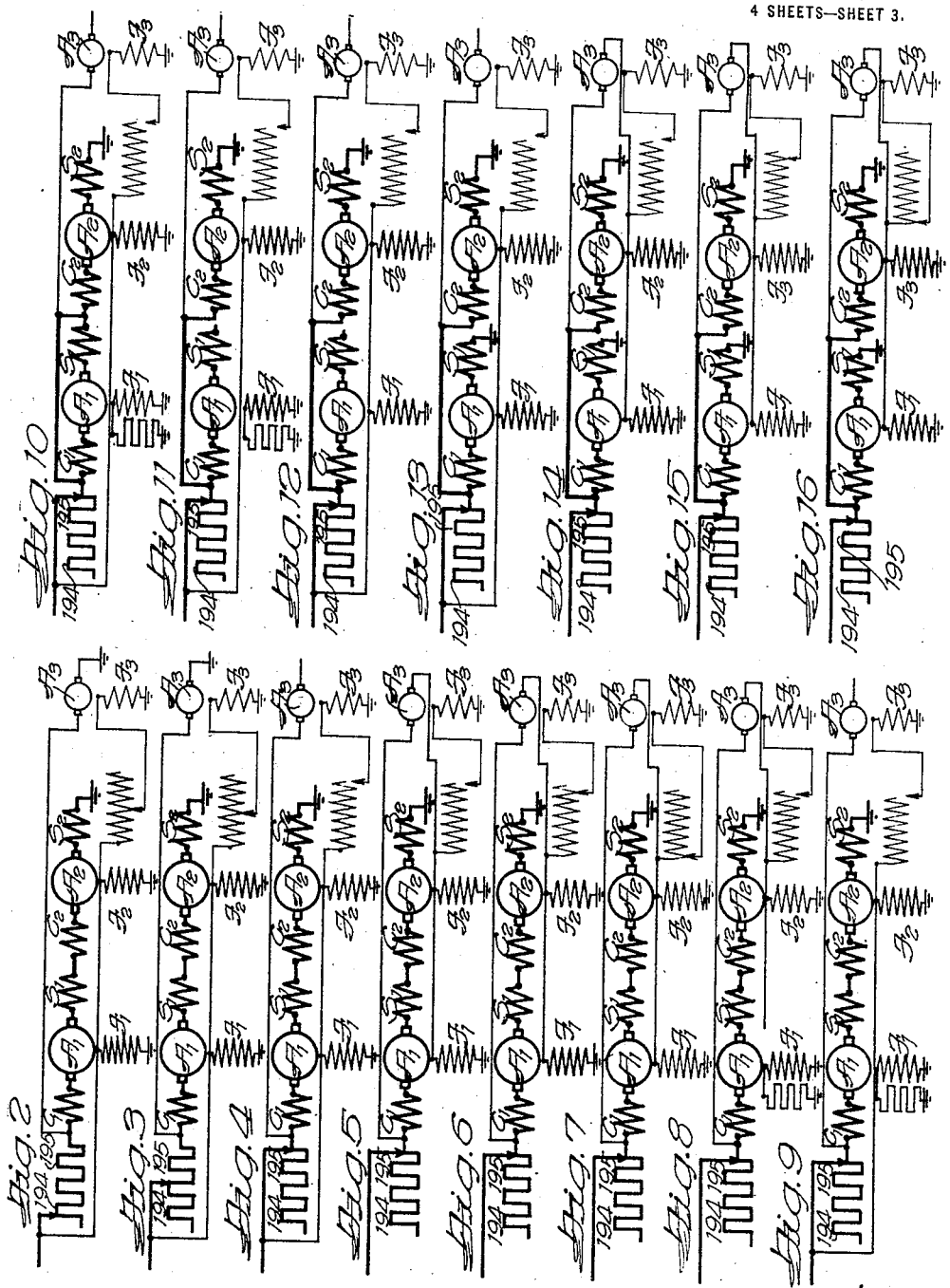

L. J. STEPHENSON.
MOTOR CONTROL SYSTEM.
APPLICATION FILED NOV. 28, 1919.
1,397,335.
Patented Nov. 15, 1921.
4 SHEETS—SHEET 4.
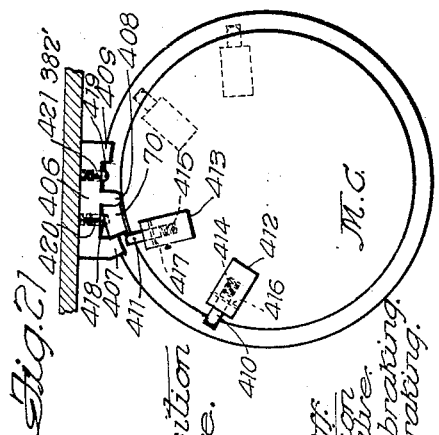
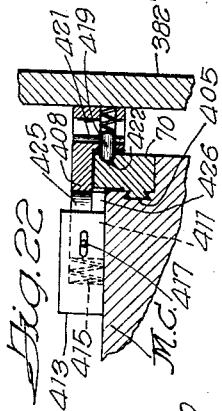
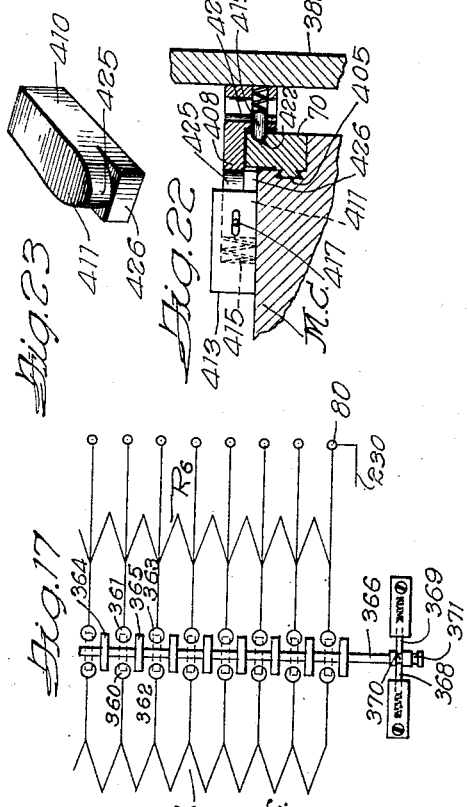
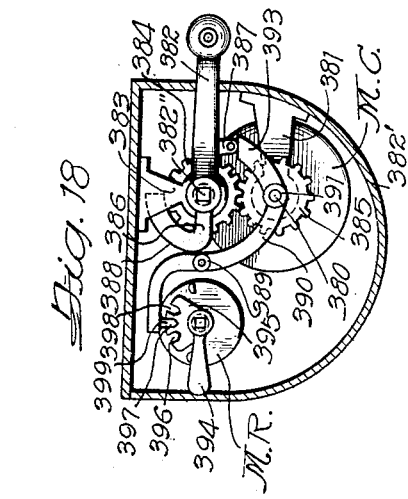
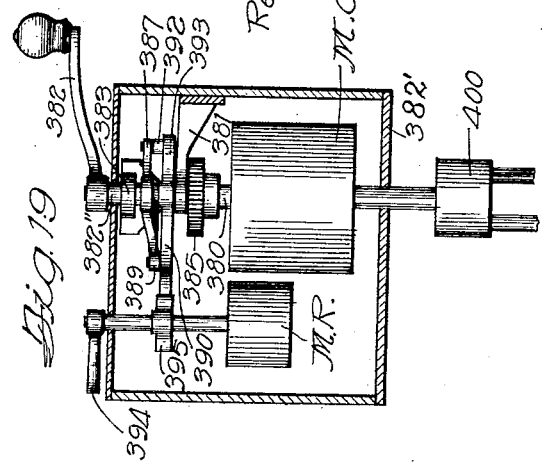
Inventor
Leigh J. Stephenson
William Bradbury & Son
Attys.

UNITED STATES PATENT OFFICE.

LEIGH J. STEPHENSON, OF CHICAGO, ILLINOIS, ASSIGNOR TO WILLIAM T. FENTON, BENJAMIN V. BECKER, LYNN A. WILLIAMS, GEORGE B. BURRAGE, AND LEIGH J. STEPHENSON, TRUSTEES, ALL OF CHICAGO, ILLINOIS.

MOTOR-CONTROL SYSTEM.

1,397,335.   Specification of Letters Patent.   Patented Nov. 15, 1921.

Application filed November 28, 1919. Serial No. 341,244.

*To all whom it may concern:*

Be it known that I, LEIGH J. STEPHENSON, a citizen of the United States, residing at Chicago, in the county of Cook and State of Illinois, have invented certain new and useful Improvements in Motor-Control Systems, of which the following is a full, clear, concise, and exact description, reference being had to the accompanying drawings, forming a part of this specification.

My invention relates to improvements in motor control systems, and is especially concerned with the provision of a novel system of multiple unit control especially applicable to the control of a plurality of motors mounted upon a plurality of cars or vehicles forming a train.

My invention is especially concerned with the provision of a system of motor control embodying the invention disclosed in my Reissue Patent No. 147,787, January 6, 1920. In this application I have disclosed certain means for controlling the speed of a motor whereby it may be given the characteristics of a series motor, and at the same time regenerative braking can be accomplished in a simple and efficient manner. This is accomplished by providing a shunt wound motor with a small regulating dynamo connected in series with the shunt field winding of the motor, in such a manner that the counter-electromotive force of the regulating dynamo opposes the potential impressed upon the shunt field winding of the motor. The armature of the regulating dynamo is so connected with the shaft of the motor that it revolves at a speed constantly proportional to the speed of the motor. The regulating dynamo is provided with a field winding which is connected in parallel with the field winding of the motor. The current flowing through the field winding of the regulating dynamo is controlled by means of an adjustable resistance.

The objects of this invention are:

First: To provide a multiple unit control system which embodies the invention disclosed in my co-pending application above referred to, comprising means whereby all of the motors will be similarly controlled so as to cause them each to assume its part of the load either during motoring or during regenerations;

Second: To provide a system of control of the character described, comprising a master controller, which may be located upon any one of the cars provided with motors, or may be located upon a car which is not provided with motors;

Third: To provide a system of the character described, in which the current flowing through the field windings of the regulating dynamos is controlled directly by the master controller, but in which the armature connections or groupings of the motors are controlled through an intermediate or main controller mounted upon each of the cars provided with motors;

Fourth: To provide means for properly controlling the current flowing in the field windings of the regulating dynamos, irrespective of the number of regulating dynamos having their field windings connected in parallel;

Fifth: To provide a system of control comprising a master controller and one or more main controllers, in which the master controller initiates the operation of the main controllers, but wherein the subsequent operation of the main controllers is controlled to some extent by the current flowing through the motors, and also by the voltage generated by one or more of the motor armatures;

Sixth: To provide a system of motor control capable of effecting regenerative braking, which is connected with the air braking system of the vehicles or train in such a manner that a single lever controls the regenerative braking and the air brakes; and Seventh: To provide a system such as described above, which is simple in construction, easy to operate, reliable, and economical to manufacture.

Other objects will appear as this description progresses, reference being had to the accompanying drawings, in which—

Figs. 1 and 1ᵃ diagrammatically illustrate the apparatus embodied in my invention as applied to the control of a train comprising a plurality of cars or vehicles;

Figs. 2 to 16 inclusive are diagrams illustrating the connections between or the groupings of the motors on a single car, during acceleration and while the car or train is being brought to a stop;

Fig. 17 is an enlarged diagrammatical sketch of the means which I employ for connecting a plurality of resistance sections in parallel whenever it is desired to operate the motors of two or more cars in parallel, the number of resistances corresponding to the number of cars provided with motors which it is desired to operate simultaneously;

Fig. 18 is a transverse section through the casing of the controller embodied in my invention, showing a plan view of the interlocking mechanism between the master controller drum and the master reversing switch;

Fig. 19 is a more or less diagrammatical sketch showing a front elevation of the interlocking mechanism shown in Fig. 17, and in addition thereto showing the connection between the master controller lever and the air brake control mechanism, the casing of the controller being shown in section;

Fig. 20 is a diagram showing the position of the master controller handle or lever under different condition of operation;

Fig. 21 is an enlarged plan view of the upper end of the master controller drum, disclosing the means which I employ for controlling a floating or sliding contact of the controller;

Fig. 22 is a longitudinal section of the master controller, showing the plunger as it disengages the sliding contact; and Fig. 23 is an isolated view in perspective of one of the plungers which are mounted in slides on top of the master controller drum.

Throughout the several drawings similar reference characters will be used for referring to similar parts.

Figs. 1 and 1^A illustrate the equipment for a three car train, in which only two of the cars are equipped with motors, but in which the remaining car carries the master controller. With the exception of that part of Fig. 1 which illustrates the details of construction of the master controller, the apparatus illustrated in Fig. 1^A is exactly similar to that shown in Fig. 1.

Referring to Fig. 1, the reference characters $M_1$ and $M_2$ indicate as a whole the two motors for driving the car, upon which control mechanism about to be described is mounted. These motors comprise the armatures $A_1$ and $A_2$ and the series field windings $S_1$ and $S_2$ respectively. For the purpose of better illustration the car wheels and the geared connections between the motors and the car wheels are omitted. The reference character D indicates as a whole the regulating dynamo, armature $A_3$ of which for convenience is illustrated as being mounted directly upon the shaft 30 of the motor $M_2$, so that it must rotate at a speed constantly proportional to the speed of the motors. The motors $M_1$ and $M_2$ are provided with the field windings $F_1$ and $F_2$ respectively, and the regulating dynamo D is provided with a field winding $F_3$.

The direction of the flow of current through the armatures, the commutating and series field windings of the motors $M_1$ and $M_2$, and the direction of the flow of current through the armature of the regulating dynamo D are controlled by the reversing switches $R_1$, $R_2$ and $R_3$ respectively, which are mounted upon a common drum $d$, upon which are also mounted the contacts 40, 41, 42 and 43, although in Fig. 1 these contacts are shown as being out of alinement with the contacts of the respective reverse switches. The contacts 40 to 43 inclusive are interlocking contacts which, in a manner presently to be described, control the position of the reverse switches. The reference character MR indicates the master reversing switch, which will be described in detail later on, and the reference character MC indicates the master controller drum, which will likewise be described in detail as this description progresses. The reference character MD indicates the drum of the main controller, with which each car provided with motors is equipped. The drum of the main controller may be actuated by means of the well known pneumatic control apparatus used by the Westinghouse Electric & Manufacturing Company, which comprises a rack 45 co-acting with a pinion 46 on the shaft 47 of the main controller drum. The opposite ends of the rack 45 are connected with the piston rods 48 and 49 respectively of the pistons 50 and 51, which slide in the cylinders 52 and 53 respectively. The admission of air and its exhaust from the two cylinders is controlled by means of the valves 54 and 55 respectively, which are in turn controlled by the "on coil" 56 and the "off coil" 57 respectively. Further description of the details of this apparatus is unnecessary, for the reason that they are well known. It is sufficient to state that when both the "on coil" and the "off coil" are energized the main controller drum is rotated in a clockwise direction, and when both of these coils are deënergized the drum is actuated in a counter-clockwise direction. If during clockwise rotation of the drum the "off coil" only be deënergized, the rotation of the drum will cease. If, during counter-clockwise rotation of the drum the "on coil" is energized, the drum will again stop.

Train lines Nos. 1, 2, 3, 4, 5, 6, 7 and 8 provide connections for connecting the master controller with the control apparatus of each of the several cars. These train lines include detachable connectors 60 to 67 inclusive, whereby as many cars may be used in forming a train as may be desired.

While any desired means may be employed for supplying current to the electrical equipment of a train embodying my invention, I have for convenience illustrated my invention in connection with a railway system in which current is collected from an overhead trolley wire W by a current collecting device T, and in which the circuit is completed through a grounded connection such, for instance, as the track rails. Also for convenience, I have illustrated the control apparatus as being supplied with current from the power mains. As this description progresses it will be clear that the current for the control apparatus can be supplied from any suitable source, either upon the train itself or external thereto.

From this point I shall combine the description of my improved apparatus with the description of the operation thereof. To start the car the master controller is turned in a clockwise direction so as to bring the contact 70 into contact with contact fingers 71 and 72 and the contacts 73, 74, 75 and 76 into contact with contact fingers 77, 78, 79 and 80 respectively. Current thereupon flows from any suitable source of current through the conductor 85, contact finger 77, contact 73, connector 86, contact 74, contact finger 78, conductor 87, to contact finger 88 of the master reversing switch. If the master reversing switch is set in its forward position, current will flow through the contact 89 of contact finger 90, conductor 91, train line No. 1, conductor 92, and conductor 93, to contact finger 94 of the interlocking contacts of the reversing switch drum $d$. If the reversing switch drum is in its reverse position, current will also flow through conductor 95, solenoid 96, contact finger 97, contact 41, contact finger 98, to ground, thereby causing the reversing switch drum $d$ to be thrown to its forward position. If the reversing switch drum $d$ is in its forward position the circuit of the solenoid 96 will be open, and it will consequently not exert any influence upon the reversing switch drum. Assuming that the reversing switch drum $d$ is in its forward position, current will pass from the contact finger 94, through the contact 42 to the contact finger 99, conductor 100, to the junction point 101 of the conductor 100, with the conductor 102.

From the above description it will be apparent that as long as the contacts 73 and 74 of the master controller are in contact with contact fingers 77 and 78, and as long as the master reversing switch and the reversing switch drum $d$ are in their forward position, the junction point 101 of the conductors 100 and 102 will have a potential impressed upon it. Since it will be necessary repeatedly to describe circuits including that part just described as lying between the conductor 85 and the junction point 101 I shall hereafter start with the junction point 101 in place of the conductor 85, so as to shorten the description as much as possible.

Returning now to the description of the operation of my apparatus, the current divides at the junction point 101, part of it flowing through the " on coil " 56, conductor 103, conductor 104, train line No. 3, conductor 105, contact finger 71, contact 70, and contact finger 72 to ground G, thereby energizing the " on coil " 56. The other part of the current flows through conductor 102, the contact finger 107 of the master controller drum, through contact 108, connector 109, contact 110, connector 111, contact 112, contact finger 120, conductor 121, " off coil " 57, conductor 122, contacts 123, 124 and 125 of the current relay CR, conductor 126 to conductor 104, and from thence to the ground through the circuit previously described.

By the connections described above, both the " on coil " and the " off coil " of the means for actuating the main controller drum are energized, thereby causing the main controller drum to start rotation in a clockwise direction. When the main controller drum reaches the first series position, a circuit is completed from the junction point 101, through conductor 102, contact finger 107, contact 108, connector 160, contact 161, contact finger 162, conductor 163, contacts 164, 165 and 166 of the contactor C—1, conductor 167, contacts 168, 169 and 170 of the contactor C—3, solenoid 171 of the line breaker LB, to ground G, thereby closing the line breaker. When the line breaker LB is closed, the circuit for this contactor is established as follows: Starting with the contact finger 94 of the reversing switch drum, which, as has been previously described, is now connected with the source of potential from which connection is made to the master controller by the conductor 85, current flows through the contact 42 of the reversing switch drum, contact finger 99, conductor 172, contacts 173, 174 and 175 of the line breaker and solenoid 171 to ground. By reason of this connection the line breaker will be held closed after the contact 161 of the main controller separates from contact finger 162. At the same time the line breaker is closed, contactor C—2 is closed through the following circuit: from the current collecting device T through the current relay solenoid, conductor 177, contact finger 178, contact 179, connectors 180, 182, 183, 184, and 185, contact 186, contact finger C—2 through a conductor not shown, to solenoid 188 of the contactor C—2, and from thence to ground, thereby closing contactor C—2.

The line breaker LB and the contactor C—2 now being closed, the two motors are now connected in series through the following circuit: circuit collecting device T, current relay CR, contacts 190, 191 and 192 of the line breaker, conductor 193, resistance sections 194 and 195, conductor 196, through the reversing switch $R_1$, conductor 197, commutating field $C_1$, and armature $A_1$ of the motor $M_1$, conductor 198, again through the reversing switch, series field $S_1$, conductor 199, through the contacts 200, 201 and 203 of contactor C—2, conductor 204 through the reversing switch $R_2$, conductor 205, commutating field $C_2$, armature $A_2$, conductor 206, again through the reversing switch $R_2$, conductor 207, and series field $S_2$ to ground.

At the same time that the two motors are connected in series with each other and the resistance sections 194 and 195, a portion of the main current flows through the armature of the regulating dynamo, thereby causing it to function as a motor to assist in starting the car. The armature circuit for the regulating dynamo branches from the main current carrying circuit, and particularly the conductor 196, at the point 210, and flows through the following circuit: conductor 211, through the reversing switch $R_3$, conductor 212, armature $A_3$, conductor 213, again through the reversing switch $R_3$, conductor 214, contact finger 215, contact 216, connector 217, contact 218, and contact finger 219 to ground. At the same time that current begins to flow through the armatures $A_1$, $A_2$, and $A_3$, the field windings $F_1$, $F_2$, and $F_3$ are supplied with current through the following circuits: Starting with the contact 179 of the main controller drum, which has previously been described as being connected through the contact finger 178 with the current collecting device T, the current flows through the connectors 180 and 182 to the contact 220, at which point the current divides, a portion thereof flowing through the contact finger 221, conductor 222, conductor 223, and field winding $F_2$ to ground. Another portion of the current flows through the connector 183 to contact 224, contact finger 225, conductor 226, field winding F—1, and conductor 227 to ground.

Part of the current passing from contact finger 221 to the conductor 223 flows from the junction point 228 of the conductor 223 with the conductor 229, through the conductor 229, through train line No. 4, conductor 230, to contact finger 80 of the master controller, contact 76, connector 231, contact 75, contact finger 79, conductor 232, train line No. 7, conductor 233, contact finger 234, contact 235, connector 236, contact 237, contact finger 238, conductor 239, resistance $R_5$, conductor 240, and through the field winding $F_3$ of the regulating dynamo to ground.

By means of the connections described above, the two motors are connected in series with each other, and with the starting resistance sections 194 and 195, and their field windings $F_1$, $F_2$ and $F_3$ are connected directly across the line. At the same time the armature of the regulating dynamo is connected directly across the line, but in series with the starting resistance sections 194 and 195. At this time the field winding of the regulating dynamo is also connected across the line, but in series with sufficient resistance $R_5$ to reduce the potential impressed upon this field winding to the potential for which this field winding is designed. These connections are illustrated diagrammatically in Fig. 2.

Upon continued rotation of the main controller drum the contactor S—1 is closed through the following circuit: Starting with contact 179 of the main controller drum, which has previously been described as being connected with the current collecting device T, current flows through the connector 180, contact 241, connector 181, contact 242, contact finger S—1, through a conductor not shown, and through the solenoid 243 of the contactor S—1, thereby closing this contactor. The closing of the contactor S—1 short circuits the resistance section 194, thereby establishing the connections shown in Fig. 3, causing the motors to accelerate.

I wish to explain at this point that if at any time during the acceleration of the motors more than a predetermined quantity of current flows through the motors, the current relay CR will operate to separate the contact 124 from the contacts 123 and 125, thereby opening the circuit of the off coil 57 and causing the main controller drum MD to cease rotating until the speed of the motors has accelerated to such a degree that the current drawn by the motors is insufficient to hold the contact 124 of the current relay out of contact with contacts 123 and 125, whereupon, the circuit of the off coil having been reëstablished, the rotation of the main controller drum in its clockwise direction will be resumed.

The resistance section 194 having been short circuited, the next step in the operation of the motors is to short circuit resistance section 195. This is accomplished by energization of the solenoid S—2 through the following circuit, which corresponds to the third series position of the main controller drum; the contact 179, connector 180, contact 241, contact finger s—2, through a conductor not shown, and the solenoid 244 of the contactor S—2, thereby short circuiting resistance section 195, causing the connections to assume the condition shown in Fig. 4, and at the same time causing the motors still further to accelerate.

In this position of the main controller drum the armature circuit of the regulating dynamo is broken by reason of the separation of the contact finger 215 from the contact 216, and at the same time its field circuit is opened by the separation of the contact finger 234 from the contact 235, thereby causing the regulating dynamo to cease assisting the motors in starting the car.

When the main controller drum, under control of the current relay CR reaches the fourth series position, the field windings $F_1$ and $F_2$ of the two motors are disconnected from the line by reason of the separation of the contacts 220 and 224 from the contact fingers 221 and 225, but at the same time these field windings are connected in series with the armature of the regulating dynamo by reason of the contacts 245 and 246 connecting with the contact fingers 221 and 225 respectively. It will be noted that the contacts 245 and 246 are connected with a contact 247 by the connectors 248 and 249, and that the contact 247 is connected by the contact finger 215, conductor 214, reversing switch $R_3$, and conductor 213, with the armature of the regulating dynamo. When these connections are established current flows from a junction point 210 of the conductor 211, with the main circuit conductor 196, through the conductor 211, reverse switch $R_3$, armature $A_3$, again through the reverse switch $R_3$, conductor 214, and contact finger 215, to the contact 247. From here the current divides, passing in one direction through the connector 248, contact 245, contact finger 221, conductors 222 and 223, through the field winding $F_2$ to ground, and in the other direction through the connector 249, contact 246, contact finger 225, conductor 226, field winding $F_1$, and conductor 227 to ground. It will therefore be seen that by these connections the regulating dynamo is connected in series with the field windings of the two motors, to form a field winding circuit, which is thrown directly across the line. The main connections of the motors and the regulating dynamos are now as shown in Fig. 5. The two resistance sections having been cut out, further acceleration of the motors is accomplished by increasing the counter-electromotive force of the regulating dynamo, thereby lessening the potential impressed upon the field windings of the motor, and correspondingly reducing the field strength of the motors. The reduction in the counter-electromotive force of the regulating dynamo is accomplished by cutting resistance into the field winding circuit of this dynamo by further movement of the master controller drum in a clockwise direction. The circuit through the field winding of the regulating dynamo will then be as follows: Starting with contact 179, current flows through the connectors 180 and 182 to the contact 220; from here through the contact finger 221, conductors 222, 229, train line No. 4, conductor 230, to contact finger 80, then through the various resistance sections of the resistance $R_6$ to contact portion 250 of contact 251, connector 252, contact 253, contact finger 254, conductor 255, train line No. 6, conductor 256, contact finger 258, contact 259, connector 260, contact 261, contact finger 262, conductor 263, and conductor 240, through field winding $F_3$ of the regulating dynamo.

These connections are diagrammatically illustrated in Fig. 6 in which practically all of the resistance $R^6$ is shown as being connected in the circuit of the regulating dynamo. Continued movement of the master controller by the motorman merely results in the cutting out of the resistance $R_6$ from the field winding circuit of the regulating dynamo until the master controller reaches the position P. (See Fig. 7 in which all of the resistance $R_6$ is shown as being cut out.) These connections bring the motors up to their highest series running speed.

It will be noted that when the main controller drum moved to the fourth series position, the contact 108 separated from the contact finger 107, thereby interrupting the supply of current to the "off coil" 57, as previously described. This would cause the main controller drum to cease rotating, and it will cease rotating unless the master controller is moved to the position P so as to bring the contact 270 into contact with contact finger 271. With the last named connection, the "off coil" 57 will be energized through the following circuit: Starting with conductor 85 current will flow through contact finger 77, contact 73, connectors 86 and 272, contact 270, contact finger 271, conductor 274, train line No. 8, conductor 275, conductor 276, contact finger 276', contact 110, connector 111, contact 112, contact finger 120, conductor 121, "off coil" 57 and conductor 122 back through the grounded connection of the master controller, as previously described. With the "off coil" 57 energized, the main controller drum will continue its rotation from the fourth series position to the first transition position. In moving to this position, the field winding circuit of the regulating dynamo is broken by reason of the separation of contact 261 from contact finger 262, thereby decreasing the counter-electromotive force of the regulating dynamo to substantially zero. At the same time field winding $F_1$ is completely disconnected from the armature circuit of the regulating dynamo by the separation of contact 246 from contact finger 225, and its ungrounded terminal is grounded by bringing contact 280 into contact finger 225 whereupon the field can discharge through contact 280, connector 281, contact 282, contact finger 283 and resistance $R_7$ to ground. The changes in the connections of the motors brought about by the movement of the main controller drum to the first transition position are illustrated in Fig. 8. With these connections the field of motor $M_1$ collapses substantially simultaneously with the building up of the field of motor $M_2$ to its maximum value. Consequently, as the counterelectromotive force of motor $M_1$ dies away, the counterelectromotive force of motor $M_2$ increases to substantially line voltage.

The next changes in the connections of the motors and regulating dynamo are diagrammatically illustrated in Fig. 9. In this figure, the field winding of motor $M_2$ is entirely disconnected from the armature of the regulating dynamo, but is connected directly across the line so as to increase the field strength, and consequently the counter-electromotive force of the motor $M_2$ to its maximum value. These changes in the connections are brought about as follows: The armature of the regulating dynamo is disconnected from the field winding $F_2$ of the motor $M_2$ by reason of the separation of contact 247 from contact finger 215, and the field winding $F_2$ is connected across the line by bringing contact 285 into conducting relation with contact finger 221, whereupon current flows from contact 179 through connector 180, contact 241, connector 286, contact finger 221, conductors 222 and 223, through field winding $F_2$ to ground.

With the above described connections the counter-electromotive force of motor $M_1$ is reduced to substantially zero, and the next step in the transition from series to parallel grouping is to short circuit motor $M_1$, as shown in Fig. 10. This is accomplished by the closing of contactor C—1. This is accomplished by the passage of current from contact 179, through connectors 180, 182, 183, 184 and 185, contact 186, connector 290, contact 291, contact finger C—1, through a conductor (not shown) to the solenoid 292 of contactor C—1 to ground.

If, for any reason, the voltage of motor $M_1$ does not fall to zero or to a predetermined low value, the contactor C—1 will not be closed for the following reasons: The circuit through the solenoid of the contactor C—1 is not closed until the main controller drum reaches the third transition position. Before it reaches this position, and, as a matter of fact, when it is moving from its first to its second transition position, the contact 110 separates from contact finger 276′ thereby again opening the circuit of the "off coil" 57, and in the absence of any other connections for energizing this "off coil," causing the main controller drum to come to a stop.

I shall now describe the means which will permit of further rotation of the master controller drum, provided the potential of motor $M_1$ has dropped to such a predetermined low value as will make it safe to short-circuit it as shown in Fig. 10. For this purpose I provide a voltage relay VR having a solenoid 300 which is connected directly across the terminals of the motor $M_1$ by the conductors 301 and 302. Connected in series with the solenoid 300 is a resistance $R_s$ having substantially the same resistance as the solenoid 300. When the two motors are connected in series only half the line voltage is impressed upon the circuit, including the solenoid 300 and the resistance $R_s$, but when the two motors are connected in parallel full line voltage is imposed upon this circuit. Since I desire to have the solenoid 300 responsive to the voltage of the single motor $M_1$ during both the series and parallel groupings, I provide the resistance $R_s$ which is short-circuited by the contacts 305 and 306 and the connector 307 as long as the motors are connected in series. When the motors are connected in parallel this short-circuit is removed, as will be described later on, so that the resistance $R_s$ will be included in series with the solenoid 300. With the main controller drum in its second transition position, contact finger 308 will rest upon contact 114 and current will flow through the following circuit to energize the "off coil," provided the voltage of motor $M_1$ has dropped sufficiently to permit contact 309 of the voltage relay VR to drop into contact with contacts 310 and 311 of the voltage relay. The circuit will then be as follows: contact finger 77 of the master controller contact 73, connectors 86 and 272, contact 270, contact finger 271, conductor 274, train line No. 8, conductor 275, contacts 310, 309 and 311 of the voltage relay, conductor 312, contact finger 308, contact 114, connector 113, contact 112, contact finger 120, conductor 121 and through the "off coil" 57 to the grounded contact 70 of the master controller, through the circuit previously described.

The motor $M_1$ having been short-circuited, as described, the next step in the transition period is to disconnect one terminal of the motor $M_1$, as shown in Fig. 11. This is accomplished when the main controller drum has turned to the fourth transition position, thereby causing separation of contact 186 from contact finger c—2, which deënergizes the solenoid of contactor C—2 thereby disconnecting one terminal of the motor $M_1$ from the former series circuit.

Before the motor $M_1$ can be thrown across the line in parallel with the motor $M_2$, its potential must again be raised to line voltage and this is accomplished by placing its field winding $F_1$ across the line in parallel with the field winding of $F_2$ of motor $M_2$. This results from the contact 315 being brought into conducting relation with contact finger 225. It will be noted that the contact 315 is connected by means of the connectors 316, 286 and 180 with the contact 179, which has previously been repeatedly referred to as a positive source of current. When this connection is established, the principal motor connections are those illustrated in Fig. 12.

After the potential of the motor $M_1$ has been increased to that of line voltage, the next step is to ground its disconnected terminal so as to place it in parallel with the motor $M_1$. I provide means which will prevent the grounding of the disconnected terminal of the motor $M_1$ until its potential has been increased to substantially line voltage. It will be noted that when the main drum controller moves from its fourth to its fifth transition position the contact 114 separates from contact finger 308, thereby interrupting the circuit of the "off coil" 57, and in the absence of anything to prevent it, bringing the main controller drum to a stop. If, however, the voltage of the motor $M_1$ is substantially equal to line voltage, the plunger of the voltage relay will be lifted and the circuit through the "off coil" will be completed as follows: Starting with contact finger 77, current will flow through contact 73, connectors 86 and 272, contact 270, conductor 274, train line No. 8, conductor 275, contact 275′ of the voltage relay, contact 309, contact 275″, conductor 276′, and, providing the contactor C—1 is closed, contacts 278′, 165 and 278″ of the contactor C—1, conductor 279′, contact finger 280′, contact 116, connectors 115 and 113 to contact 112, and from this contact through the "off coil," over the circuit previously described. If the voltage of the motor $M_1$ is not substantially line voltage or if the contactor C—1 is not closed, the above circuit will be interrupted and the "off coil" will not be energized. Consequently, the main controller drum will remain stationary until the voltage of the motor $M_1$ rises to substantially line voltage and the contactor C—1 is closed. This is followed by the closing of contactor C—3 when the main controller drum is turned to its sixth position by energization of its solenoid through the following circuit: contact 179 of the main controller connectors 180, 182, 183, 184, 185, 290 and 317, contact 318, contact finger c—3, a conductor (not shown), through the solenoid 319′ of contactor C—3 to ground. It will be noted that there is an interlock between contactor C—2 and contactor C—3 which permits the closing of contactor C—3 only in the event contactor C—2 has previously been opened, this interlock comprising the contacts 319, 320 and 321 of the contactor C—2. This interlock is to prevent a direct grounding of the line which would occur if contactor C—2 should be closed at the same time that contactor C—3 is closed. The main motor connections are, after the above connections have been completed, such as are illustrated in Fig. 13.

The next step is to connect the regulating dynamo in series with the two field windings of the motors, (see Fig. 14), whereby the potential impressed upon the field windings of the motors is decreased by the drop of potential in the armature of the regulating dynamo and by any counter-electromotive force it may generate by reason of its residual magnetism. I thus slightly weaken the fields of the motors and acceleration in their speed is produced. This change in connections is brought about by the separation of contacts 285 and 315 from the contact fingers 221 and 225, respectively, whereby the field windings $F_1$ and $F_2$ are disconnected from the line and by then bringing contacts 320′ and 321′ under contact fingers 221 and 225, respectively. The contacts 320′ and 321′ are connected with the dynamo through the contact 322 and the connectors 323 and 324, respectively, the contact 322 now being under contact finger 215, which, as has previously been described, is connected with one terminal of the regulating dynamo.

The main controller drum in moving to the first parallel position caused the separation of contact 112 from contact finger 120, thereby opening the circuit of the "off coil" 57 and causing the main controller drum to come to rest in its first parallel position. Further acceleration is produced by moving the master controller drum in a clockwise direction whereby contact 325 is brought under contact finger 326, and the portion 327 of contact 328 successively cuts out portions of the resistance $R_6$ in the same manner in which contact 250 produced this same effect while the motors were connected in series and as described in connection with Figs. 6 and 7, the circuit for the regulating dynamo field winding being as follows: starting with the junction point 228 of the conductor 229 and the conductors 222 and 223 at which point the current divides between field winding $F_2$ and the field winding of the regulating dynamo, the current passing through the conductor 229, train line No. 4, conductor 230, contact finger 80, contacts 327 and 328, connector 328″, contact 325, contact finger 326, conductor 326′, train line No. 5, conductor 326″, contact finger 328′, contact 329′, connector 330′, contact 333′, contact finger 262, conductor 263, and through the field winding $F_3$ to ground. When the resistance $R_6$ is entirely excluded from the circuit of the regulating dynamo field winding, the motors will be operated at their top speed.

Speed regulation is accomplished with either the series or the parallel groupings of the motor by manipulating the master controller to exclude more or less of the resistance $R_6$ from the field winding circuit of the regulating dynamo. If the motors are operating at their highest parallel running speed and it is desired to bring the vehicle to a stop, the master controller is operated in a counter-clockwise direction to the position P at a rate which will produce the desired braking rate. It will, of course, be clear that in moving from the top running speed position to the position P, the resistance $R_6$ is being cut into the field winding circuit of the regulating dynamo, thereby reducing its counter-electromotive force and correspondingly increasing the field strength of the motors which causes them to generate a voltage higher than line voltage and thus return current to the line.

As will later on be described, the contact 70 of the master controller is so constructed and connected with the master controller drum that when the master controller is operated to cause acceleration of the motors, the contact 70 is brought into conducting relation with the contact fingers 71 and 72 and held in this position while the master controller is operated to the position corresponding to the highest running speed of the motors. This means is of such construction that it holds the contact 70 in the position referred to while the master controller drum is being returned to the P position for the purpose of bringing the motors to a stop. The mechanical details of the means for causing the contact 70 to be held as described above will be described later on. It is sufficient for the present to state that the contact 70 is not separated from the contact fingers 71 and 72 while the master controller is being returned to the P position, and that, consequently, the ground connections for the "on coil" and the "off coil" are not destroyed during this operation of the master controller.

When the master controller is turned to the P position in a counter-clockwise direction, the contact 328 is separated from contact finger 79, thereby breaking the circuit of the field winding of the regulating dynamo and establishing the connection shown in Fig 14, as a result of which the counter-electromotive force of the regulating dynamo is decreased and the fields of the two motors correspondingly increased, thereby holding their voltage above that of the line. Upon moving the master controller drum from its P position in a counter-clockwise direction, means are provided for carrying the contact 70 from under the contact fingers 71 and 72, thereby interrupting the ground circuit for both the "on coil" and the "off coil." These coils being deënergized, the main controller drum starts rotation in a counter-clockwise direction. The details of the mechanical means for causing the contact 70 to move with the contact drum from its P position will be described later on. After counter-clockwise motion of the main controller drum has been initiated, it continues to move until it reaches the fourth transition position, thereby causing the connections of the motors to consecutively pass through the changes illustrated in Figs. 13, 12 and 11. The next change in the connections of the motors which must be accomplished in bringing them to a stop is to connect the motor $M_1$ in series with motor $M_2$, but by reason of the fact that in moving to the third transition position the motor $M_1$ is short-circuited, as shown in Fig. 10, it is necessary that the voltage of this motor should be substantially zero before it is connected in series with motor $M_2$. I, therefore, provide means to prevent the main controller drum from moving to the third transition position until the voltage of the motor $M_1$ has dropped to a predetermined low value. It will be noted that the main controller drum is provided with two contacts 340 and 341 connected by a connector 342. When the main controller drum reaches its fourth transition position, these contacts and the connector 342 establish a connection between the contact fingers 343 and 344. If the voltage of the motor $M_1$ has not dropped to a predetermined low value, its contact carrying plunger will be in its raised position and contact 345 will close the gap between contacts 346 and 347, thereby permitting current to flow through the "on coil" over the following path: Starting with the junction point 101 current flows through the "on coil," conductor 103, conductor 348, contacts 346, 345, 347, conductor 349, contact finger 344, contact 341, connector 342, contact 340 and contact finger 343 to ground. The "on coil" being energized the main controller drum will be stopped and held in the fourth transition position until the voltage of the motor $M_1$ drops to such a value as to permit the contact 345 to drop away from the contacts 346 and 347, thereby deënergizing the "on coil" and permitting the main controller drum to resume its counter-clockwise motion toward its off position. The main controller drum will thereupon continue its rotation, causing the connections between the motors to consecutively change, as illustrated in Figs. 10, 9 and 8, to that shown in Fig. 7. In order to be able to properly retard the speed of the vehicle, it is necessary to hold the main controller drum in its fourth series position while the resistance $R_6$ is being gradually cut into the field winding circuit of the regulating dynamo. For this purpose, I provide the controller with two contacts 350 and 351 connected by connector 352. When the main controller reaches its fourth series position, a circuit is closed through the "on coil," starting with junction point 101, passing through the "on coil," conductors 103 and 348, conductor 353, contact finger 354, contact 350, connector 352, contact 351 and contact finger 343 to ground. The "on coil" being energized, the main controller drum is brought to rest, whereupon the master controller is moved in a counter-clockwise direction to cut in the resistance $R_6$ in the field winding circuit of the regulating dynamo, whereby its voltage is reduced, the voltage upon the motor field windings increased, and the voltage of the motors correspondingly increased, causing a still further return of power to the line. When all of the resistance $R_6$ in included in the field circuit winding of the regulating dynamo, the connections of the motors and the regulating dynamo are substantially those shown in Fig. 6, and upon a slight further movement of the master controller in a counter-clockwise direction, contact finger 79 is separated from contact 251, thereby opening the field circuit of the regulating dynamo, as shown in Fig. 4.

When the master controller is turned to its off position, the circuit for supplying current to the on and off coils is interrupted by reason of the separation of contact 73 from contact finger 77, whereupon the main controller drum consecutively passes through positions III, II and I, causing the connections of the motors and the regulating dynamo illustrated in Figs. 4, 3 and 2 to be consecutively formed. The return of the master controller, as well as the return of the main controller to its off position, interrupts the holding circuit of the line breaker, thereby permitting it to open, and thus restores all of the apparatus to its original condition.

It is impossible to bring the motors of the vehicle to a complete stop by means of regeneration, and, consequently, some other means must be used to accomplish this result after regeneration has brought the speed of the motors down to substantially their lowest series running speed. I shall later on describe how I propose to effect a complete stoppage of the vehicle by means under control of the master controller lever.

If the master reversing switch is thrown to "reverse," and the reversing switch drum $d$ is in its reversed position, current will flow from the contact finger 77, contact 73, connector 86, contact 74, conductor 87, through contact 89' of the reversing switch, contact finger 90' to conductor 91', train line No. 2, conductor 92', conductor 93', contact finger 94', contact 43, contact finger 99, conductor 100 to the junction point 101 where the current will divide and pass through the on and off coils, as previously described. If the reverse switch drum $d$ is in its forward position when the master reversing switch is thrown to the reverse position, current will pass through the solenoid 96' and contact finger 97', contact 40, contact finger 98, to ground, thereby throwing the switch to its reverse position.

The train lines connect the corresponding parts of the electrical equipment of all the cars provided with the motors in parallel, so that the motors on all the cars will be simultaneously and similarly controlled by the master controller. Inasmuch as the master controller directly controls the flow of current through the field winding circuits of all of the regulating dynamos, and by this I mean that the current passing through the field windings of the regulating dynamos passes through the master controller, it is necessary to provide as many resistances $R_6$, $R'_6$, etc., as there are cars provided with motors, so that the drop in potential over the field windings of the regulating dynamos will be the same for any one position of the master controller lever irrespective of the number of cars provided with motors that are being operated. Any means may be used for connecting a plurality of the resistances $R_6$ in parallel, one means being illustrated in Fig. 17 wherein the various sections of the resistances $R_6$, $R'_6$ are provided with opposed contacts 360, 361, 362, 363, etc., which are adapted to be connected by contacts 364 and 365, respectively, mounted in an insulated relation upon a common supporting rod 366. Means are provided for holding the rod 366 in one of two positions. In one of these positions the contacts on the rod rest upon the contacts 360 to 363, inclusive, thereby placing the resistances $R_6$ and $R'_6$ in parallel, and in the other position the contacts 364 and 365 are separated from the contacts 360 to 363, inclusive, thereby disconnecting the two resistances. For holding the rod 366 in either of these two positions, I have illustrated a pair of spring-pressed plungers 368 and 369, respectively, adapted to seat in either the groove 370 or the groove 371 of the rod 366 and thereby holding it in either of its two positions. It will, of course, be understood that the means which I have illustrated for connecting a plurality of resistances $R_6$ in parallel are merely illustrative, and that any other desired means may be used for accomplishing this result.

I shall next describe the means by which I interlock the master controller and the master reversing switch so as to prevent the operation of the reversing switch when the master controller is on any of its running points. The master controller drum MC is provided with a shaft 380 the upper end of which is journaled in the bracket 381 and the lower end of which is journaled in the casing 382' of the controller. The master controller lever 382 is mounted upon the upper end of a shaft 382'' which is journaled in a bracket 383, and is provided at its lower end with a spur gear 384 which meshes with a spur gear 385 on the upper end of the shaft 380. As a result of the above construction the master controller drum MC will be rotated in a clockwise direction when the lever 382 is rotated in a counterclockwise direction. A pair of oppositely extending arms 386 and 387 are secured to the shaft 382''. The arm 386 is provided with an arcuate cam 388 adapted to engage with a roller 389 adjacent one end of the bell crank lever 390. The bell crank lever is pivoted at 391 upon the bracket 381. The arm 387 is provided with a roller 392 adapted to engage the other end 393 of the bell crank lever. The master reversing switch MR is provided with a handle 394 to which is secured a sector plate 395 having three notches 396, 397 and 398 formed therein for receiving the pin 399 mounted upon the end of the bell crank lever carrying the roller 389. The notches 396 and 398 of the sector 395 co-act with the pin 399 to hold the master reversing switch in its forward and reverse positions, respectively, and the notch 397 co-acts with the pin 399 to hold the master reversing switch in its neutral position.

In this construction when the lever 382 is moved in a counter-clockwise direction to start the car, the arcuate-shaped cam 388 maintains constant contact with the roller 389 and locks the pin 397 in any one of the notches in the sector plate in which it may happen to be, thereby preventing any adjustment of the reversing switch when the controller lever 383 is in a running position. When the lever 382 is moved in a clockwise direction, it pushes down upon the end 393 of the bell crank lever, causing the opposite end of the bell crank lever to carry the pin 399 out of the opening in the sector plate in which it may happen to be, thereby permitting the master reversing switch to be adjusted by means of the handle 394, as desired. If the master reversing switch is not properly adjusted to bring one of the openings in the locking sector in registry with the pin 399, it will be impossible to operate the lever 382 to start the car because the cam 388 will lock against the roller and prevent any operation of the lever 382 in a counter-clockwise direction.

The lower end of the shaft 380 operates the motorman's air brake valve 400 to control the air brakes. This valve is so adjusted relative to the lever 382 and the contacts upon the master controller drum that the air brakes will be released when the lever 382 is between the positions marked by the radii I, II, of the diagram shown in Fig. 20. The valve will be in its lap position when the lever 382 is in the position indicated by radius III, and in its service and emergency braking positions when in the positions indicated by the radii IV and V, respectively.

In the preceding description I have referred to means for moving the contact 70 to a position corresponding to the first position of the master controller and holding it in this position while the master controller is being moved to the highest running speed position and also holding it in this position while the master controller is being returned to the P position for the purpose of bringing the car to a stop, and comprising other means for returning the contact 70 to its off position when the master controller is moved from the P position to the off position. I shall now describe the means which I employ for controlling these movements of the contact 70. Referring to Figs. 21 and 22, the contact 70 is illustrated as being slidably mounted upon the upper end of the master controller drum, it being provided with a dove-tail shaped projection 405 for engaging in a similarly shaped annular groove in the periphery of the master controller drum. Secured to the wall of the controller casing 382' is a bracket 406 comprising three spaced projections 407, 408 and 409, respectively, which project over the upper end of the master controller drum in such a manner as to be engaged by the plungers 410 and 411 mounted in the guides 412 and 413, respectively, which are secured to the upper end of the master controller drum. These plungers are urged outwardly by means of springs 414 and 415, respectively, and are prevented from being completely expelled from the guides by means of pins 416 and 417 sliding in slots formed in the guides 412 and 413, respectively. The bracket 406 is provided with a pair of spring-pressed plungers 418 and 419, respectively, which are likewise prevented from being expelled from the bracket by means of pins 420 and 421 sliding in suitable slots formed in the bracket. The contact 70 is provided with a slight depression 422 in the outer face of its upper end for receiving the rounded ends of the plungers 418 and 419, respectively.

The plungers 410 and 411 are each formed as shown in Fig. 23 and their outer ends each comprise a rounded cam-shaped portion 425 and a square-ended portion 426. As shown in Fig. 22 the rounded portions 425 are disposed in the same horizontal plane as the projection 408, while the square-ended portions 426 are disposed in lower planes so as to engage the inner side of the upper end of the contact 70.

The guides 412 and 413 are illustrated in Fig. 21 in the positions which they occupy when the controller is in its off position. The contact 70 is likewise shown in its off position in this figure. When the master controller drum is actuated in a clockwise direction to start the car, the square-ended portion 426 of the plunger 411 will engage the side face of the contact 70 and upon the continued rotation of the master controller drum will move it to the space between the projection 408 and stop 409, in which position the rounded end of the plunger 419 will engage the recess 422 in the face of the contact 70 and hold it in this position. Further movement of the contact 70 by the square-ended portion of the plunger 411 is prevented by the stop 409 and by the engagement of the rounded end portion 425 of the plunger 411 with the rounded end of the projection 408, which pushes the plunger 411 back into its guide so as to release its square-ended portion from engagement with the contact 70. The plunger 411 thereupon slides past the contact 70 without carrying the contact with it. Upon continued rotation of the controller drum, the rounded end of the plunger 410 will be brought into contact with the rounded end of the projection 408, thereby causing the plunger 410 to be forced into its guide so that its square-ended portion will not engage the contact 70. The master controller drum then continues its rotation until the guides 412 and 413 occupy the positions shown in dotted outline in Fig. 21, this position of the master controller drum being its highest running speed position.

In bringing the car to a stop the master controller is rotated in a counter-clockwise direction until the square-ended portion of the plunger 410 engages the side face of the contact 70 and moves it into its former position between the stop 407 and the projection 408 where it is held by the plunger 418 and the stop 407. The round-ended portion of the plunger 410 thereupon engages the rounded end of the projection 408 and disengages the square-ended portion of the plunger 410 from the contact 70, thereby permitting it to pass behind the contact 70 without carrying the contact with it. In a similar manner the plunger 411 in returning to its off position is engaged by the rounded portion of the projection 408 and forced inwardly so as to prevent it from carrying the contact 70 with it. The plunger 410 engages the contact 70 to move it from its position between the projections 408 and 409 to its position between the projections 407 and 408 just as the controller contacts are moving from the P position toward the off position so as to bring about the desired change in certain connections, as described above.

While I have described the details of the preferred embodiment of my invention, it is to be clearly understood that these details are merely illustrative and that my invention is not limited to these details, but is capable of other adaptations and modifications within the scope of the appended claims.

Having thus described my invention, what I claim is:

1. The combination with a plurality of vehicles each having a plurality of motors, of a regulating dynamo for controlling the operation of the motors of each vehicle, said regulating dynamos each having a field winding, means on each vehicle for reversing the direction of the flow of current through the motors and the regulating dynamo of each vehicle, a main controller on each vehicle, a plurality of electrically controlled switches on each vehicle controlled by the main controller of the respective vehicles to connect said motors on the respective vehicles in series or parallel relation, a master controller for controlling the operation of all of said main controllers and the flow of current in the field windings of said regulating dynamos, and means controlled by the current flowing through the motors of each car and the voltage of one of the motors of each car for further controlling the operation of the respective main controllers.

2. The combination with a plurality of vehicles each having a plurality of motors, of a regulating dynamo for controlling the operation of the motors of each vehicle, said regulating dynamos each having a field winding, means on each vehicle for reversing the direction of the flow of current through the motors and the regulating dynamo of each vehicle, a main controller on each vehicle, a plurality of electrically controlled switches on each vehicle controlled by the main controller of the respective vehicles to connect said motors on the respective vehicles in series or parallel relation, and a master controller for controlling the operation of all of said main controllers and the flow of current in the field windings of said regulating dynamos.

3. The combination with a plurality of vehicles each having a plurality of motors, of a regulating dynamo for controlling the operation of the motors of each vehicle, means on each vehicle for reversing the direction of the flow of current through the motors of each vehicle, and the regulating dynamo of each vehicle, a main controller on each vehicle, a plurality of electrically controlled switches on each vehicle controlled by the main controller of the respective vehicles to connect said motors on the respective vehicles in series or parallel relation, a master controller for controlling the operation of all of said main controllers, and means controlled by the current flowing through the motors of each car and the voltage of one of the motors of each car for further controlling the operation of the respective main controllers.

4. The combination with a vehicle provided with a pair of motors of a plurality of electrically operated switches for connecting said motors in different relations, a main controller for controlling the operation of said switches, a master controller for initiating the operation of said main controller, and means controlled by the current flowing through said motors and the voltage of one of said motors for controlling the subsequent operation of said main controller.

5. The combination with a pair of motors each having a shunt field winding, of means for changing the connections between said motors from series to parallel or vice versa, comprising means responsive to the voltage of one of said motors for preventing excessive current through the armatures of such motors during transition.

6. The combination with a pair of motors of means for changing the connections between said motors from series to parallel or vice versa, comprising means controlled by the voltage of one of said motors for preventing excessive current through the armature of said motor during transition.

7. The combination with a vehicle provided with a pair of motors of a plurality of electrically operated switches for connecting said motors in different relations, a main controller for controlling the operation of said switches, a master controller for initiating the operation of said main controller, and means controlled by the voltage of one of said motors for controlling the subsequent operation of said main controller.

8. The combination with a pair of motors of means for connecting said motors either in series or parallel relation comprising controlling mechanism, means for initiating the operation of said controlling mechanism, and means controlled by the flow of current through said motors and the voltage of one of said motors for subsequently controlling the operation of said controlling mechanism.

9. The combination with a pair of motors of means for connecting said motors either in series or parallel relation comprising controlling mechanism, and means controlled by the flow of current through said motors and the voltage of one of said motors for controlling the operation of said controlling mechanism.

10. The combination with a plurality of vehicles of a plurality of motors for driving each of said vehicles, a regulating dynamo on each vehicle, a field winding for each regulating dynamo, a main controller on each vehicle, means for actuating said main controllers, a master controller for controlling said actuating means, said master controller comprising a plurality of resistances adapted to be connected in series with the field windings of said regulating dynamos, means for connecting as many of said resistances in parallel as there are regulating dynamos, a contact for cutting said resistances in or out, and train lines extending from said master controller to each of said vehicles for connecting said master controller with the field windings of said regulating dynamos.

11. The combination with a plurality of vehicles, each provided with a motor, of a dynamo on each vehicle for controlling the operation of the respective motors, said regulating dynamos each having a field winding and a controller for controlling the operation of all of said motors comprising an adjustable rheostat, means for connecting said field windings in parallel, and means for varying the current carrying capacity of said rheostat proportionately to the number of field windings connected in parallel.

12. The combination with a plurality of motors, each having a field winding, of a regulating dynamo connected in series with each of said field windings to form a field winding circuit in such a manner that the electromotive force of said regulating dynamos opposes the potential impressed on said field winding circuits, a field winding for each of said regulating dynamos, means for connecting said regulating dynamo field windings in parallel, and means for controlling the current therethrough.

13. The combination with a pair of motors, each having a field winding, of a regulating dynamo adapted to be connected in series with said field windings to form a field winding circuit, means for impressing a potential upon said field winding circuit in a direction opposite to the electromotive force of said regulating dynamo, means for controlling the operation of said motors comprising a main controller and a master controller, said master controller comprising a sliding contact for controlling the operation of said main controller, means for actuating said sliding contact to one position during the acceleration of said motors, and other means for moving said contact from said position when the master controller is moved from the parallel position toward a series position whereby the main controller is caused to return to its off position.

14. The combination with a pair of motors of a main controller for controlling their operation, a master controller for controlling the operation of said main controller, said master controller comprising means for causing said main controller to follow the operation of said master controller during the acceleration of said motors, but to remain stationary during the stopping of said motors until the said master controller has been moved to a position corresponding to an intermediate speed of said motors.

15. The combination of a pair of motors of means for controlling the operation of said motors, comprising a main controller for controlling the armature circuits of said motors, and a master controller for controlling said main controller, said master controller comprising means for directly controlling the field strength of said motors.

16. The combination with a plurality of motors each having a field winding, of means for impressing a voltage on each of said field windings, a regulating dynamo connected in series with each of said field windings to oppose the voltage impressed on said field windings, a field winding for each of said regulating dynamos connected in shunt to the field winding of the associated motors, and means for regulating the current in said regulating dynamo field windings comprising a plurality of resistances corresponding in number to the number of regulating dynamos, each of said resistances being divided into sections, common contact terminals for said resistance sections, and means for connecting said sections to said common contacts in parallel relation.

17. The combination with a plurality of motors each having a field winding, of means for impressing a voltage on each of said field windings, a regulating dynamo connected in series with each of said field windings to oppose the voltage impressed on said field windings, a field winding for each of said regulating dynamos connected in shunt to the field winding of the associated motors, and means for regulating the current in said regulating dynamo field windings comprising a plurality of resistances corresponding in number to the number of regulating dynamos, common contact terminals for said resistances, and means for connecting said resistances to said common contacts in parallel relation.

18. The combination with a plurality of motors, each having a field winding, the said motors and their field windings being divided into corresponding groups, means for impressing a voltage on each group of field windings, a regulating dynamo connected in series with each group of field windings to oppose a voltage impressed thereon, a field winding for each of said field winding dynamos, a plurality of resistances, and means for connecting a number of said resistances corresponding in number to the number of regulating dynamos in parallel.

19. The combination with a plurality of motors, each having a field winding, the said motors and their field windings being divided into corresponding groups, means for impressing a voltage on each group of field windings, a regulating dynamo connected in series with each group of field windings to oppose a voltage impressed thereon, a field winding for each of said field winding dynamos, and adjustable means for controlling the current in said field windings, comprising means for maintaining a predetermined drop in voltage over said field windings for any one setting of said current controlling means, irrespective of the number of field windings.

20. The combination with a plurality of vehicles, each driven by a plurality of motors, said motors each having a field winding, of a regulating dynamo for each vehicle connected in series with the field windings of said motors, each of said regulating dynamos having a field winding, a main controller on each vehicle for controlling the armature connections of said motors, a master controller comprising means for directly controlling the current flowing in the field windings of all of said regulating dynamos, and train lines for connecting said master controller with said regulating dynamo field windings and said main controllers.

21. The combination with a plurality of vehicles, each driven by a plurality of motors, said motors each having a field winding, a main controller on each vehicle for controlling the armature connections of said motors, a master controller comprising means for controlling the current flowing in the field windings of all of said motors, and train lines for connecting said master controller with said field windings and said main controllers.

22. The combination with a plurality of motors, of means for connecting said motors either in series or parallel relation comprising a device responsive to the voltage across the terminals of one of said motors, and, means for rendering the device responsive to a lower voltage when said motors are in series than when said motors are in parallel.

In witness whereof, I hereunto subscribe my name this 25th day of November, 1919.

LEIGH J. STEPHENSON.

Witnesses:
ANDREW WINTERCORN,
EDNA A. GUSTAFSON.